US006030168A

United States Patent [19]
Kröll et al.

[11] Patent Number: 6,030,168
[45] Date of Patent: Feb. 29, 2000

[54] LIFTING DEVICE

[75] Inventors: Joachim Kröll, Jüchen; Hermann Franzen, Mönchengladbach, both of Germany

[73] Assignee: Mannesmann Aktiengesellschaft, Düsseldorf, Germany

[21] Appl. No.: 08/828,177

[22] Filed: Mar. 18, 1997

[30] Foreign Application Priority Data

Mar. 22, 1996 [DE] Germany ........................... 196 12 990

[51] Int. Cl.[7] ........................................................ B65G 1/00

[52] U.S. Cl. .......................... 414/561; 414/560; 414/342; 212/273

[58] Field of Search .................................... 187/226, 234, 187/237, 274; 212/273, 312, 324, 326, 327; 414/342, 391, 392, 560, 561, 334, 336, 140.3, 141.3, 141.5, 142.6; 294/81.1, 81.3

[56] References Cited

U.S. PATENT DOCUMENTS

| | | | |
|---|---|---|---|
| 3,262,580 | 7/1966 | Markowitz | 212/324 |
| 3,645,406 | 2/1972 | Brazell | 212/326 X |
| 3,759,409 | 9/1973 | Wenzel et al. | 212/324 X |
| 3,784,028 | 1/1974 | Stewart | 212/326 |
| 3,858,688 | 1/1975 | Galloway | 187/274 X |
| 4,433,952 | 2/1984 | Glickman | 212/324 X |
| 5,110,251 | 5/1992 | Gray | 187/274 X |
| 5,597,987 | 1/1997 | Gilliland et al. | 187/274 X |

FOREIGN PATENT DOCUMENTS

| | | | |
|---|---|---|---|
| 403192092 | 8/1991 | Japan | 212/273 |
| 000715373 | 2/1980 | U.S.S.R. | 212/324 |

*Primary Examiner*—Robert P. Olszewski
*Assistant Examiner*—Steven B. McAllister
*Attorney, Agent, or Firm*—Cohen, Pontani, Liberman & Pavane

[57] ABSTRACT

A lifting device constructed as a frame or gantry vehicle which is supported on four movable vertical supports. The gantry vehicle further comprises a crane trolley which is horizontally movable along a frame on a plurality of rails. Two vertically arranged lifting cylinders are rigidly fastened at the trolley in a plane parallel to the vertical longitudinal center planes of the load carrying means and trolley trolley such that at least their synchronously telescoping piston rods project into the space below the trolley and support a load carrying arrangement at their free ends.

3 Claims, 1 Drawing Sheet

LIFTING DEVICE

BACKGROUND OF THE INVENTION

1. Field of the Invention

The present invention relates to a lifting device, and more particularly, to a lifting device having two cylinders rigidly fastened to a horizontally movable structural component part from which load carrying means are suspended.

2. Description of the Related Art

The lifting device disclosed in German Patent Application DE 42 19 370 A1 has a movable structural component part arranged as a traveling crane trolley which is movable on a bridge or overhead traveling crane and as a part of a boom or gantry of a crane vehicle. The lifting device includes load carrying means, especially grip frames or spreaders for containers, semitrailers and the like. In known lifting mechanisms, the load carrying means are securely connected with the load to prevent relative movement therebetween during loading and unloading.

When loading and unloading containers, interchangeable superstructures or the like, the latter are lifted and lowered vertically as well as moved horizontally. However, the short movement periods necessary to optimize the processing capacity of the lifting device disadvantageously produce large accelerations and correspondingly large transverse forces.

It is recognized that pendulum-like swinging motion occurs in load carrying means suspended by cables due to the traveling motion of the horizontally movable structural component parts. This causes problems particularly when the load must be set down in precise fashion, e.g., on the frame of a vehicle. The same problem occurs as the result of wind forces. The swinging motion must be compensated for by costly cable guides or rocking inhibitors.

To solve the problem of swinging, the lifting device disclosed in DE 42 19 370 A1 proposes the use of piston-cylinder units between the horizontally movable structural component part and the load carrying means in place of the cables used previously. At least six such piston-cylinder units are supported between the movable structural component part and the load carrying means via a traveling articulated arrangement. At least four of the six or more control cylinders are inclined and fixed in place to compensate for the unwanted swinging movement.

However, this solution is very cumbersome and requires synchronization of the piston-cylinder units when raising and lowering the load—which is difficult to produce in cylinders articulated on various spatial axes. Moreover, the use of six or more spatially arranged lifting cylinders is costly in terms of procurement and maintenance.

SUMMARY OF THE INVENTION

It is accordingly an object of the present invention to provide a simple and economic lifting device capable of manipulating a variety of loads without the typically attendant and troublesome swinging movement of the lifting device and load.

The lifting device of the present invention is advantageously constructed as a frame or gantry vehicle which is supported on four movable vertical supports. The gantry vehicle further comprises a crane trolley which is horizontally movable along a frame on a plurality of rails. Two vertically arranged lifting cylinders, having synchronously telescoping piston rods, are rigidly fastened to the trolley such that the piston rods project into the space below the trolley and support load carrying means at their free ends.

The present invention is based on the concept that a pendulum-like swinging can only be reliably prevented by a rigid articulation of the load carrying means. The present invention demonstrates that this result can be achieved with only two piston-cylinder units if the latter are arranged vertically and are rigidly fastened to the horizontally movable trolley. A lifting device configured accordingly prevents the load from swinging in the simplest possible manner due to the rigid arrangement of the two cylinders. The solution according to the present invention is simple and economical compared with known lifting devices. For example, the present invention reduces the weight by approximately 40% and decreases production costs by at least 35% when compared with conventional cable hoists, which prevent the load from swinging by means of complicated cable guides.

According to another feature of the present invention, the lifting cylinders and lifting pistons are dimensioned for absorbing transverse forces encountered during rolling movement of the lifting device, wind loads and/or eccentric load guidance. The cylinders and pistons consequently resist bending at least to the extent that the piston rods may be displaced in spite of such encountered shearing loads, notwithstanding some minimal unavoidable elastic deformation.

The lifting cylinders are configured to allow the piston rods to absorb the shear-like forces generated by and/or encountered during movement of the lifting device. This dimensional relationship between the lifting cylinders and piston rods also allows the piston rods to elastically deform in response to such forces without impairing the telescoping movement of the piston rods within the lifting cylinders. Consequently, the swinging of the load due to the occurring forces can be reduced by an order of magnitude, as determined by the permissible bending of the piston rod of the cylinder. With a proper layout of the piston rod and cylinder, essentially trouble-free telescoping movement of the piston rod is assured.

In a further development of the present invention, the load carrying means are articulably fastened at the free ends of the piston rods via vertical elongated holes. It is thereby possible to compensate for differences in the synchronous movement of the cylinders and for inclined loads.

Often, it is required to load and unload electric railroad vehicles in which the load must be manipulated below the electrical contact wire. According to another feature of the present invention, the vertical longitudinal center plane of the load carrying means are offset laterally by at least 500 mm relative to the plane in which the two lifting cylinders are arranged so that it is possible to load and unload such vehicles by means of the asymmetrically suspended load carrying means without having to move the contact wire and without the possibility of dangerous contact therewith. Consequently, the present invention provides a simple solution to the problem of loading and unloading loads under contact wires by employing a defined eccentric articulation of the load—such solution being available heretofore only at great expense.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
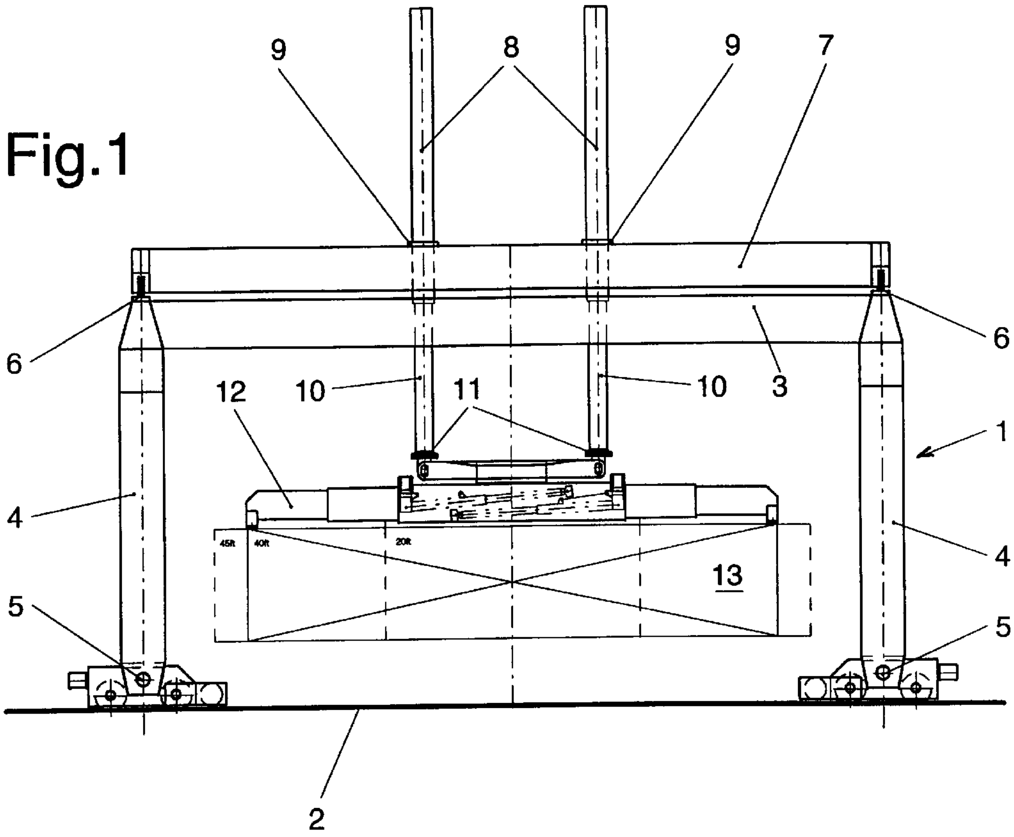
FIG. 1 is a side view of a lifting device according to the present invention.

Referring now to the drawings, and in particular, to FIG. 1, a movable lifting device or gantry vehicle configured according to the present invention is generally designated by reference number 1. The movable lifting device 1 includes a horizontal frame 3 which is supported on four vertical supports 4 which are movable by a traveling mechanism 5 on rails 2 or wheels (not shown). A horizontal crane trolley 7 is movable on the frame 3 on rails 6 extending vertically with reference to the drawing plane. Two lifting cylinders 8 are arranged at a right angle to the trolley 7 and rigidly fastened thereto at reference number 9. The cylinders 8 include synchronously telescoping piston rods 10 having free ends 11 which project generally downward into the free space below the trolley 7. The free ends 11 receive the load carrying means, here spreader 12 which is articulated at the free ends 11 by elongated vertical holes. Consequently, variations in the synchronous movement of the piston rods 10 and rocking movement or inclined position of the load 13 can be accommodated by the present invention. The load carrying means 12 can be securely connected with the load 13, e.g., a container, in a known manner.

The lifting cylinders 8 and piston rods 10 are relationally dimensioned to allow the piston rods 10 to absorb and attenuate various transverse forces generated and encountered by the lifting device 1 during transportation of the load 13. In addition, the piston rods 10 are configured to elastically deform in response to such transverse forces without adversely impacting the telescoping movement of the piston rods 10 within the lifting cylinders 8. It is thereby possible, according to a preferred embodiment of the present invention, to transport a variety of loads 13 under a variety of conditions without generating the pendulum-like swinging movement typically associated with lifting devices of the type described herein. Furthermore, the lifting device 1 of the present invention is configured to absorb and attenuate various transverse forces encountered during transportation of the load 13 without affecting the operation thereof.

Figure 2:
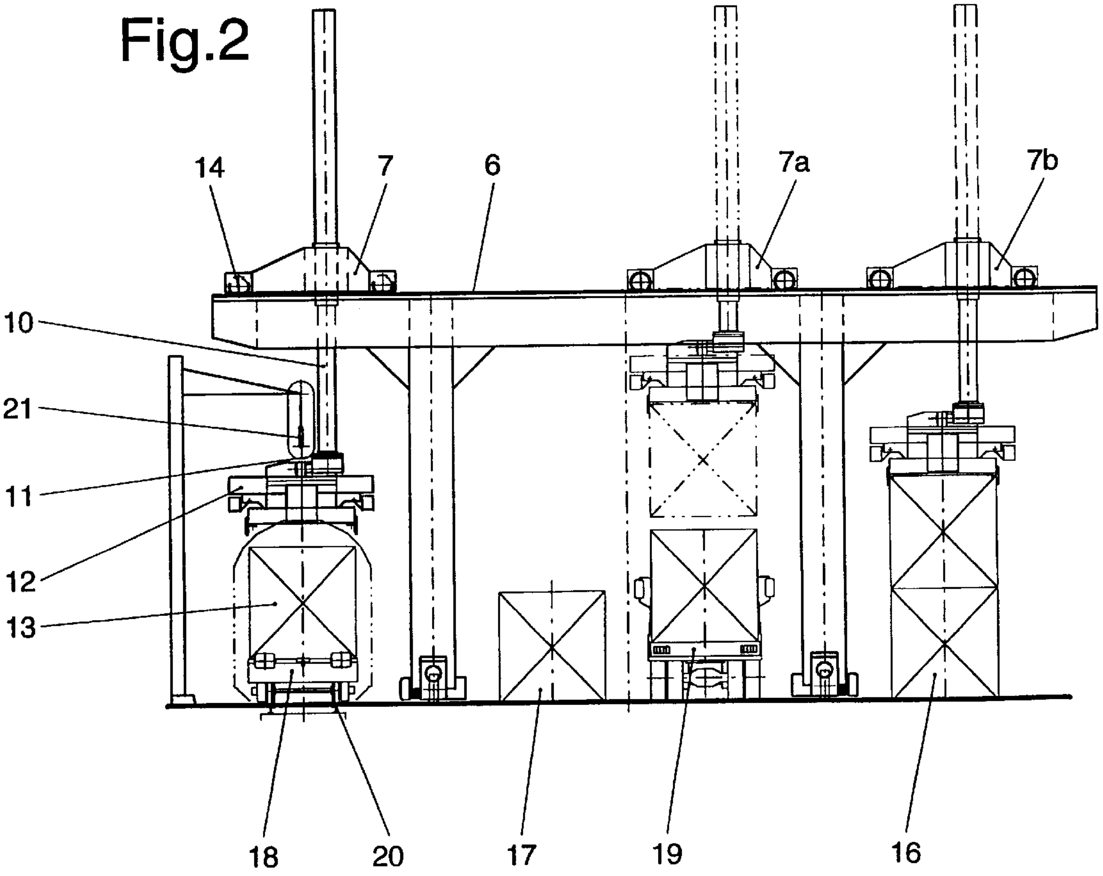
FIG. 2 is a front view of the lifting device of FIG. 1.

Referring next to FIG. 2, it is apparent that the trolley 7 is movable on the rails 6 at reference number 14 and can service different loading and unloading locations, e.g., locations indicated at 7*a* and 7*b*. Position 7*a*, for example, shows a load 13 carried by the lifting device 1 suspended above a truck 19. The load 13 can be delivered by or to the truck 19 and, in either case, may be brought to rest on an intermediate storage location 17. Position 7*b* of FIG. 2 shows a load 13 set down on an intermediate storage location 16. Once again, position 7*b* of the load 13 may be the initiatory or terminal point for the load 13.

The operation of the lifting device 1 illustrated at the left-most side of FIG. 2 depicts a load 13 placed on an electric rail car 18 which is movable on rails 20. A contact wire 21 is located above the rail car 20 is disposed within the loading region of the load carrying means 12. For this reason, the vertical longitudinal center plane of the load carrying means 12 and the vertical longitudinal center plane of the piston rod 10 are offset, preferably by at least 500 mm, so that the load 13 can be manipulated below the electrical wire 21 and loaded onto the car 18 without the piston rod 10 contacting the contact wire 21.

Neither the eccentrically engaged load 13 nor wind forces acting on the load 13 can impair the operability of the lifting cylinders 8 and piston rods 10. This is because the lifting cylinders 8 are fastened to the trolley 7 in an extremely stable and rigid manner and the piston rods 10 are dimensioned with respect to the lifting cylinders 8 to allow slight bending of the piston rods 10 under shear loads while still avoiding the troublesome swinging motion typically associated with such lifting devices. The ability of the piston rods 10 to flex and thereby absorb various shear-type forces does not impair the telescoping operation of the combined lifting cylinders 8 and piston rods 10.

In operation during a loading procedure, and by way of non-limiting example, the trolley 7 is moved to position 7*b* (FIG. 2) to pick up a load 13 resting on an intermediate storage location 16. The piston rods 10 are synchronously deployed downward and out of the lifting cylinders 8 until the load carrying means 12 engage the load 13. The load 13 is then secured to the load carrying means 12 in a known manner and the load 13 is lifted off the intermediate storage location 16 by synchronous retraction of the piston rods 10. The load 13 may then be transported from position 7*b* toward an awaiting rail car 18 by moving the structural component part 7 along rails 6.

During transportation, the load 13, load carrying means 12, piston rods 10 and lifting cylinders 8 are subject to shear-type forces and are also prone to pendulum-like rocking movement. The piston rods 10 are dimensioned with respect to the lifting cylinders 8 to allow the piston rods 10 to elastically flex and deform to absorb the encountered forces and attenuate their effect on the operation of the lifting device 1.

The piston rods 10 cannot be completely retracted when loading an electric rail car 18 because of possible interference with the contact wire 21. However, complete or partial retracting of the piston rods 10 is possible when loading and unloading vehicles without overhead obstructions, e.g. non-electrical rail cars and trucks. Once the load 13 is positioned over the rail car 18, the piston rods 10 are synchronously lowered to place the load 13 on the rail car 8.

The extremely stable and rigid manner in which the lifting cylinders 8 are fastened to the trolley 7, i.e. the rigid articulation of the load carrying means 12, provides a lifting device 1 which prevents the pendulum-like swinging typically associated with such lifting devices. In addition, the allowable slight flexure of the piston rods 10 due to the relational dimensioning with the lifting cylinders 8 provides an inexpensive and simple lifting device 1 which is capable of absorbing transverse forces generated by movement of the lifting device 1, i.e pendulum-like swinging, in addition to wind shear and/or eccentric load guidance forces. Accordingly, the piston rods 10 resist bending under various transverse forces, while elastically deforming to an allowable extent without preventing continued and proper displacement of the piston rods 10.

The invention is not limited by the embodiments described above which are presented as examples only but can be modified in various ways within the scope of protection defined by the appended patent claims.

What is claimed is:

1. A lifting device for transporting a load, consisting essentially of:

a trolley configured for horizontal movement at a height and defining a free space downward therefrom;

two lifting cylinders rigidly fastened at said trolley each of said lifting cylinders including a piston rod arranged for substantially synchronous ascending and descending telescoping movement within said lifting cylinder, said piston rods having free ends and projecting generally downward into said free space; and load carrying means supported entirely at said free ends of said two piston rods and arranged for ascending and descending movement therewith, said load carrying means and said trolley each having a vertical longitudinal center plane and said lifting cylinders being vertically arranged on a plane offset and parallel to said vertical longitudinal center planes of said load carrying means and said trolley said lifting device being subject to transverse forces during movement of said trolley and said piston rods being subject to elastic deformation, said piston rods being dimensioned for movement within said lifting cylinders so that the elastic deformation of said piston rods absorbs the transverse forces encountered during movement of said trolley, and wherein the elastic deformation does not impede the telescoping movement of said piston rods within said lifting cylinders.

2. The lifting device as defined in claim 1, wherein said load carrying means has a forward edge and a rearward edge, the vertical longitudinal center plain of the load carrying means being arranged midway between the forward and rearward edges, said two lifting cylinders being connected to said load carrying means at a position between the vertical longitudinal center plain of the load carrying means and one of the forward edge and the rearward edge of the loading carrying means.

3. The lifting device as defined in claim 1, wherein said vertical longitudinal center plane of said load carrying means is offset laterally by at least 500 mm relative to said vertical plane in which said two lifting cylinders are arranged.

* * * * *